United States Patent
Johnson (10) Patent No.: US 9,073,030 B2
(45) Date of Patent: Jul. 7, 2015

(54) APPARATUSES AND RISERS FOR REACTING FEEDSTOCK IN THE PRESENCE OF CATALYST AND METHODS FOR INSTALLING BAFFLES IN RISERS

(71) Applicant: UOP LLC, Des Plaines, IL (US)

(72) Inventor: Daniel Robert Johnson, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 34 days.

(21) Appl. No.: 13/972,818

(22) Filed: Aug. 21, 2013

(65) Prior Publication Data

US 2015/0056103 A1 Feb. 26, 2015

(51) Int. Cl.
| | | |
|---|---|---|
| *B01J 8/18* | (2006.01) | |
| *B01J 19/24* | (2006.01) | |
| *F27B 15/02* | (2006.01) | |
| *C10G 11/18* | (2006.01) | |
| *B01J 19/00* | (2006.01) | |
| *B01J 8/08* | (2006.01) | |

(52) U.S. Cl.
CPC .... *B01J 19/006* (2013.01); *B01J 8/18* (2013.01); *F27B 15/02* (2013.01); *B01J 8/08* (2013.01); *C10G 11/18* (2013.01); *B01J 19/24* (2013.01)

(58) Field of Classification Search
CPC ............... B01J 8/00; B01J 8/18; B01J 8/08; B01J 19/00; B01J 19/24; F27B 15/00; F27B 15/02; C10G 11/18
USPC ............... 422/214, 139, 140, 145, 215, 224; 208/113
See application file for complete search history.

(56) References Cited

U.S. PATENT DOCUMENTS

| | | | |
|---|---|---|---|
| 2,780,617 A * | 2/1957 | Zletz ............................. 526/69 |
| 4,417,974 A | 11/1983 | Haunschild | |
| 4,721,603 A | 1/1988 | Krug et al. | |
| 4,753,780 A * | 6/1988 | Bowen ........................ 422/214 |
| 4,963,328 A | 10/1990 | Haddad et al. | |
| 5,139,748 A * | 8/1992 | Lomas et al. ................. 422/140 |
| 5,306,418 A | 4/1994 | Dou et al. | |
| 5,338,438 A * | 8/1994 | Demoulin et al. ............ 208/153 |
| 5,455,010 A | 10/1995 | Lomas et al. | |
| 5,552,119 A | 9/1996 | Holmes | |
| 6,511,635 B2 * | 1/2003 | Mauleon et al. ............. 422/145 |

(Continued)

FOREIGN PATENT DOCUMENTS

| | | |
|---|---|---|
| CN | 102329634 A | 1/2012 |
| EP | 1456325 B1 | 3/2006 |

OTHER PUBLICATIONS

Yang, et al., "Effect of Baffles on Solids Fraction in High Density Riser," Petrochemical Technology, v 30, n 1, p. 32-36, 2001, ISSN: 10008144.

(Continued)

*Primary Examiner* — Walter D Griffin
*Assistant Examiner* — Huy-Tram Nguyen
(74) *Attorney, Agent, or Firm* — James C. Paschall (57) ABSTRACT

Embodiments of apparatuses and risers for reacting a feedstock in the presence of a catalyst and methods for installing a baffle in such risers are provided. In one example, a riser comprises a sidewall that defines a cylindrical housing surrounding an interior. A plurality of baffle assemblies is releasably coupled to the sidewall and each comprises a baffle section. The baffle sections together define a segmented baffle ring extending inwardly in the interior.

18 Claims, 5 Drawing Sheets

(56) References Cited

U.S. PATENT DOCUMENTS

| | | |
|---|---|---|
| 6,596,242 B1 | 7/2003 | Dries |
| 6,613,290 B1 * | 9/2003 | Senior ............................ 422/140 |
| 6,792,762 B1 * | 9/2004 | Yamanaka et al. ............... 60/782 |
| 7,332,131 B2 | 2/2008 | Chen et al. |
| 7,658,889 B2 * | 2/2010 | Roux et al. .................... 422/145 |
| 7,935,314 B2 | 5/2011 | Couch et al. |
| 7,964,157 B2 | 6/2011 | Dries et al. |
| 7,972,565 B2 | 7/2011 | Lambin et al. |
| 8,877,132 B2 * | 11/2014 | Johnson et al. ............... 422/139 |
| 2002/0112988 A1 * | 8/2002 | Mauleon et al. .............. 208/113 |
| 2005/0129608 A1 * | 6/2005 | Takehara et al. .......... 423/445 B |
| 2011/0315603 A1 | 12/2011 | Skoulidas et al. |
| 2013/0280138 A1 * | 10/2013 | Johnson et al. ................ 422/144 |

OTHER PUBLICATIONS

Bollas, et al., "Modeling Small-Diameter FCC Riser Reactors. A Hydrodynamic and Kinetic Approach," Industrial and Engineering Chemistry Research, v 41, n 22, p. 5410-5419, Oct. 30, 2002, ISSN: 08885885.

Jiang, et al., "Baffle Effects on Performance of a Catalytic Circulating Fluidized Bed Reactor," AIChE Journal, ISSN: 00011541, V 37 n 9, p. 1392-1400, Sep. 1991.

* cited by examiner

APPARATUSES AND RISERS FOR REACTING FEEDSTOCK IN THE PRESENCE OF CATALYST AND METHODS FOR INSTALLING BAFFLES IN RISERS

TECHNICAL FIELD

The technical field relates generally to apparatuses and risers for reacting a feedstock in the presence of catalyst, and more particularly relates to apparatuses and risers including a segmented baffle for improving catalyst contact with a feedstock for reacting, e.g., cracking, the feedstock and methods for installing such baffles in such risers.

BACKGROUND

Fluid catalytic cracking (FCC) is a well known process for the conversion of relatively high boiling point hydrocarbons to lighter hydrocarbons. In many catalytic cracking reactors, often referred to as riser reactors or risers, e.g., vertical pipe reactors, a relatively long chain hydrocarbon feedstock, e.g., crude oil feedstock, reacts in contact with a catalyst to produce shorter chain products and spent catalyst (e.g., catalyst particles covered with coke). This process can be referred to as cracking the feed. The feedstock and fluidized catalyst are introduced at a lower entrance to the vertical riser, and travel vertically upwards within the riser reacting at very high temperatures until reaching an upper exit. The riser is often internally lined to minimize heat loss and resist erosion and/or corrosion.

Reaction efficiency in the riser depends, among other factors, on good (e.g., plug flow) and uniform mixing between the vaporized feedstock and fluidized catalyst. It is desirable that the feedstock be uniformly dispersed in a stream of fluidized catalyst that is moving up the riser. In many risers, however, even if near uniform dispersion is achieved at the riser entrance (feed contacting point), non-uniform mixing can occur as the materials travel upwards due, at least in part, to non-uniform cross-sectional gas velocities that result from temperature differentials, frictional drag, solid density gradients, and other factors. In some risers, for example, the upward velocity of the feedstock is lower near the riser wall and higher near the center. This non-uniform velocity profile may be referred to as reactor slip. Under such conditions, more dense fluidized catalyst tends to concentrate near the wall in the slower moving feedstock. This leads to uncontrolled mixing of the feed and catalyst which results in lower reaction efficiency and yield.

Attempts have been made to improve mixing along the vertical flow path of the riser. For example, obstacles such as baffles or other contact devices have been proposed to create turbulence and redirection of flow to cause more uniform mixing in the riser. Unfortunately, implementing and maintaining baffles in risers, which are typically relatively tall, e.g., heights of 10 to 50 meters (m), and narrow, e.g., internal diameters of 1 to 4 m, is difficult in general and is particularly problematic in retrofit situations in which the riser must be cut for access and erosion must be controlled downstream of the baffles. Additionally, safely removing and replacing baffles in risers, for example, during shutdown and/or maintenance of the riser is also problematic due to poor access to the internal riser which results in a prolonged maintenance time requirement.

Accordingly, it is desirable to provide apparatuses and risers for reacting a feedstock in the presence of a catalyst and methods for installing baffles in such risers with improved implementation of the baffles to increase reaction efficiency and valuable product yield. Additionally, it is desirable to provide methods for installing baffles in risers in which the baffles are relatively easy to remove and replace, for example, during shutdown and/or maintenance of the risers. Moreover, it is desirable to have the baffle completely shop fabricated and cured such that there is no field construction or maintenance and repairs required in the riser (at site). Furthermore, other desirable features and characteristics of the present invention will become apparent from the subsequent detailed description and the appended claims, taken in conjunction with the accompanying drawings and this background.

BRIEF SUMMARY

Apparatuses and risers for reacting a feedstock in the presence of catalyst and methods for installing baffles in such risers are provided herein. In accordance with an exemplary embodiment, a riser comprises a sidewall that defines a cylindrical housing surrounding an interior. A plurality of baffle assemblies is releasably coupled to the sidewall and each comprises a baffle section. The baffle sections together define a segmented baffle ring extending inwardly in the interior.

In accordance with another exemplary embodiment, an apparatus for fluid catalytic cracking of a feedstock is provided. The apparatus comprises a riser that is configured for contacting the feedstock with a catalyst to form a cracked product stream and a spent catalyst. The riser comprises a sidewall that defines a cylindrical housing surrounding an interior. A plurality of baffle assemblies is releasably coupled to the sidewall and each comprises a baffle section. The baffle sections together define a segmented baffle ring extending inwardly in the interior. A reactor vessel is in fluid communication with the riser and is configured to separate the spent catalyst from the cracked product stream. A stripper is in fluid communication with the reactor vessel and is configured to remove adsorbed and/or entrained hydrocarbons from the spent catalyst. A regenerator is in fluid communication with the stripper and is configured to regenerate the spent catalyst to form regenerated catalyst for use in the apparatus.

In accordance with another exemplary embodiment, a method for installing a baffle in a riser for reacting a feedstock in the presence of catalyst is provided. The method comprises the steps of providing a sidewall that defines a cylindrical housing surrounding an interior. A plurality of baffle sections is releasably coupled to the sidewall to define a segmented baffle ring that extends inwardly in the interior.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to apparatuses and risers for reacting a feedstock in the presence of a catalyst and methods for installing baffles in such risers. The exemplary embodiments taught herein provide a riser comprising a sidewall that defines a cylindrical housing surrounding an interior. A plurality of baffle assemblies is releasably coupled to the sidewall of the riser. The baffle assemblies each comprise a baffle section and together the baffle sections define a segmented baffle ring. The segmented baffle ring extends inwardly in the interior of the riser. As such, the segmented baffle ring can effectively act as a contact flow disruptor device for the upwardly flowing feedstock and catalyst in the riser, thereby creating turbulence in the riser to cause more uniform mixing of the feedstock and catalyst to increase reaction efficiency and valuable product yield. Additionally, in an exemplary embodiment, each of the baffle assemblies is independently releasably coupled to the sidewall of the riser to facilitate installation including removal and replacement of the segmented baffle ring in a piecewise orderly manner.

Figure 1:
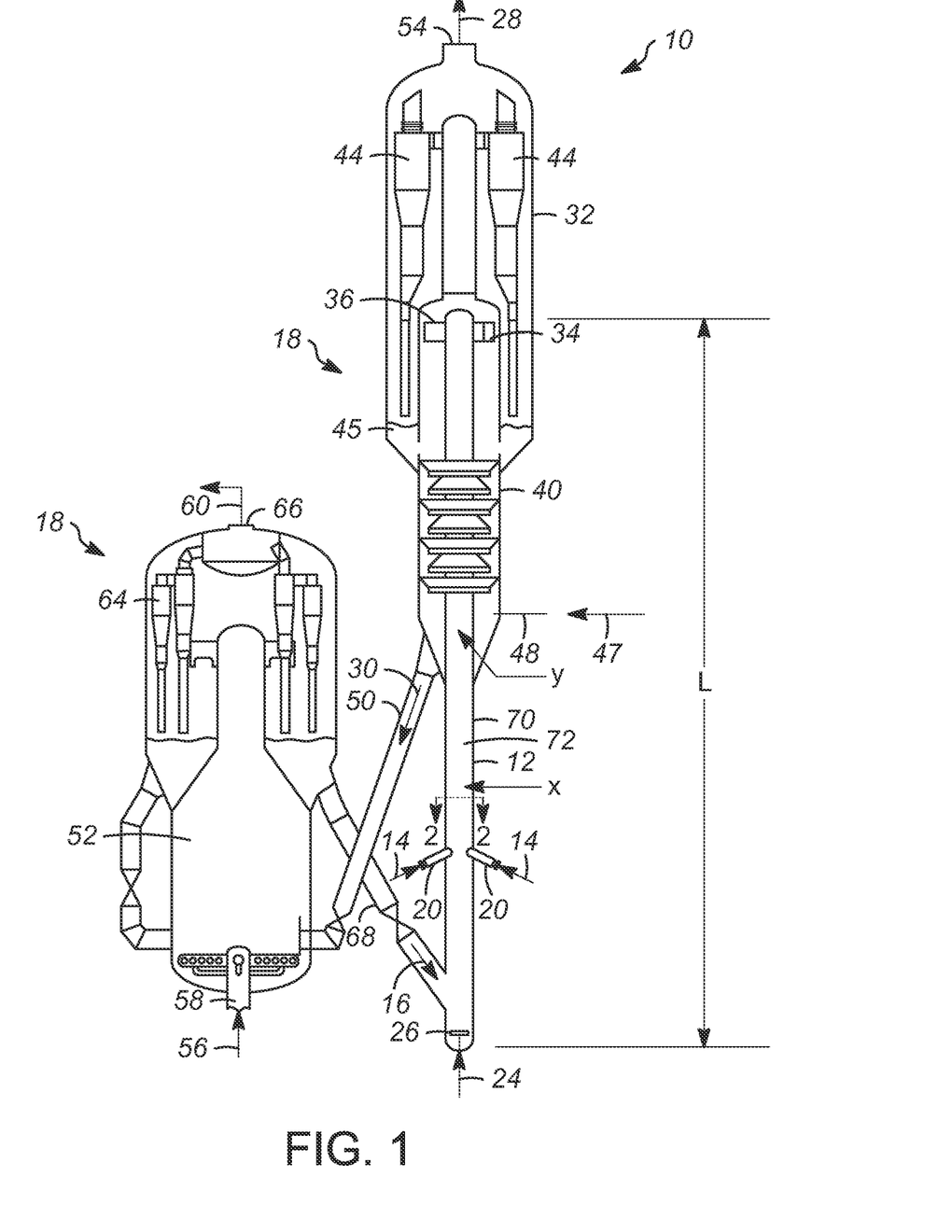
FIG. 1 schematically illustrates an apparatus including a riser for reacting a feedstock in the presence of a catalyst in accordance with an exemplary embodiment.

FIG. 1 schematically illustrates an apparatus 10 including a riser 12 for reacting a feedstock (indicated by single headed arrows 14) and a catalyst (indicated by single headed arrows 16) in accordance with an exemplary embodiment. As illustrated, the apparatus 10 is configured as a fluid catalytic cracking (FCC) apparatus 18 that may be used for an FCC process. The feedstock 14 is injected via feed distributors 20 into the riser 12 where it contacts a lift medium (indicated by single headed arrow 24) and the catalyst 16. The lift medium 24 may include inert gas such as steam that is distributed by a lift medium distributor 26. As will be discussed in further detail below, the feedstock 14 is cracked in the riser 12 in the presence of the catalyst 16 to form a cracked product stream (indicated by single headed arrow 28) and spent catalyst (indicated by single headed arrow 30). The distributors 20 and 22 may be located at different radial positions to improve the feedstock 14 distribution in the riser 12 and mixing with the catalyst 16.

In an exemplary embodiment, the injected feedstock 14 mixes with a fast fluidized bed of the catalyst 16 and moves up the riser 12 reacting, e.g., cracking, and enters the reactor vessel 32. In the reactor vessel 32, the blended catalyst and reacted feed vapors are then discharged from the top of the riser 12 through the riser outlet 34 and separated into the cracked product stream 28 (e.g., cracked product vapor stream) and a collection of catalyst particles covered with substantial quantities of coke and generally referred to as the spent catalyst 30. A disengager 36, provided at the end of the riser 12, may further enhance initial catalyst and cracked hydrocarbon separation by imparting a tangential velocity to the exiting spent catalyst 30 and the cracked product stream 28. The spent catalyst 30 that is separated by the disengager 36 drops down into the stripper 40.

In an exemplary embodiment, the cracked product stream 28 comprising cracked hydrocarbons and some spent catalyst 30 may exit the disengager 36 and may enter into the cyclones 44. The cyclones 44 may remove the remaining spent catalyst 30 from the cracked product stream 28 to reduce particle concentrations to very low levels. The spent catalyst 30 that is separated by the cyclones 44 returns to the reactor vessel 32 through diplegs into a dense bed 45 where the spent catalyst 30 will enter the stripper 40. The stripper 40 removes adsorbed and/or entrained hydrocarbons from the spent catalyst 30 by counter-current contact with steam (indicated by single headed arrow 47). Steam 47 may enter the stripper 40 through a line 48. A coked (spent) catalyst conduit 50 transfers spent catalyst 30 to a regenerator 52. As illustrated, the cracked product stream 28 exits the top of the reactor vessel 32 through a product outlet 54 for further downstream processing.

The regenerator 52 receives the spent catalyst 30 and typically combusts the coke from the surface of the spent catalyst particles by contact with an oxygen-containing gas (indicated by single headed arrow 56). The oxygen-containing gas 56 enters the bottom of the regenerator 52 via a regenerator distributor 58. Flue gas (indicated by single headed arrow 60) passes upwardly through the regenerator 52. Regenerator cyclones 64, or other means, remove entrained catalyst particles from the rising flue gas 60 before the flue gas 60 exits the regenerator 52 through an outlet 66. Combustion of coke from the catalyst particles raises the temperatures of the catalyst 16. The catalyst 16 may pass, regulated by a control valve, through a regenerator standpipe 68 that fluidly communicates with the bottom portion of riser 12.

In the FCC process, the lift medium 24 such as steam may be passed into the riser 12 to contact and lift the catalyst 16 in the in the riser 12 to the feed point (e.g., proximate the distributors 20 and 22). In an exemplary embodiment, the catalyst 16 that has been regenerated and passed along through the regenerator standpipe 68 will have a temperature of from about 649° C. to about 760° C. Catalyst coolers on the regenerator may be used. Additionally, the regenerator 52 may be operated under partial carbon monoxide (CO) combustion conditions. Moreover, water or light cycle oil may be added to the bottom of the riser 12 to maintain the appropriate temperature range in the FCC apparatus 18. Conversion of the feedstock is defined by conversion to gasoline and lighter products with 90 volume percent (vol. %) of the gasoline product boiling at or below about 193° C. using ASTM D-86. In an exemplary embodiment, the conversion is from about 55 to about 90 vol. % as produced. In an exemplary embodiment, the riser 12 is operating at a temperature of from about 427 to about 649° C., for example from about 482 to about 593° C. Additionally, the pressure in the riser 12 is from about 103 to about 241 kPa (gauge), for example from about 120 to about 160 kPa (gauge).

Figure 2:
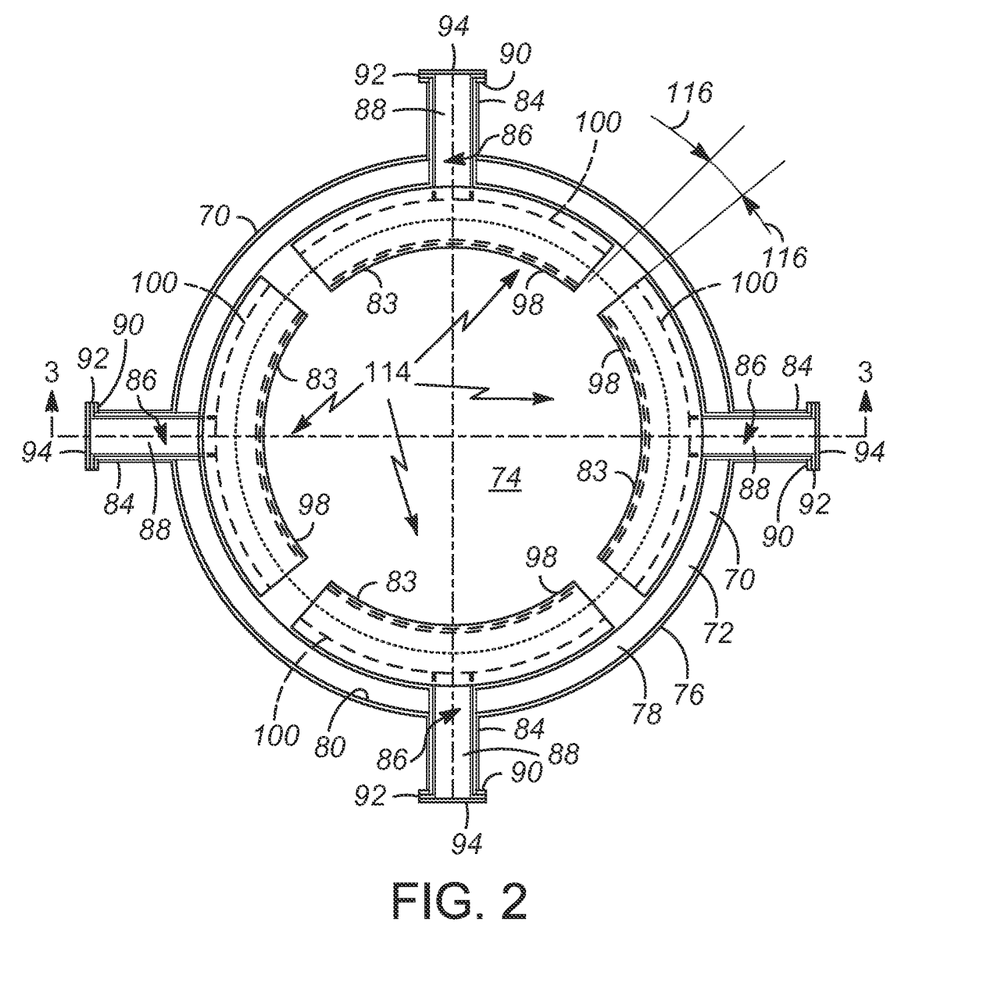
FIG. 2 illustrates, in cross-sectional view, the riser depicted in FIG. 1 along line 2-2 in accordance with an exemplary embodiment.
Figure 3:
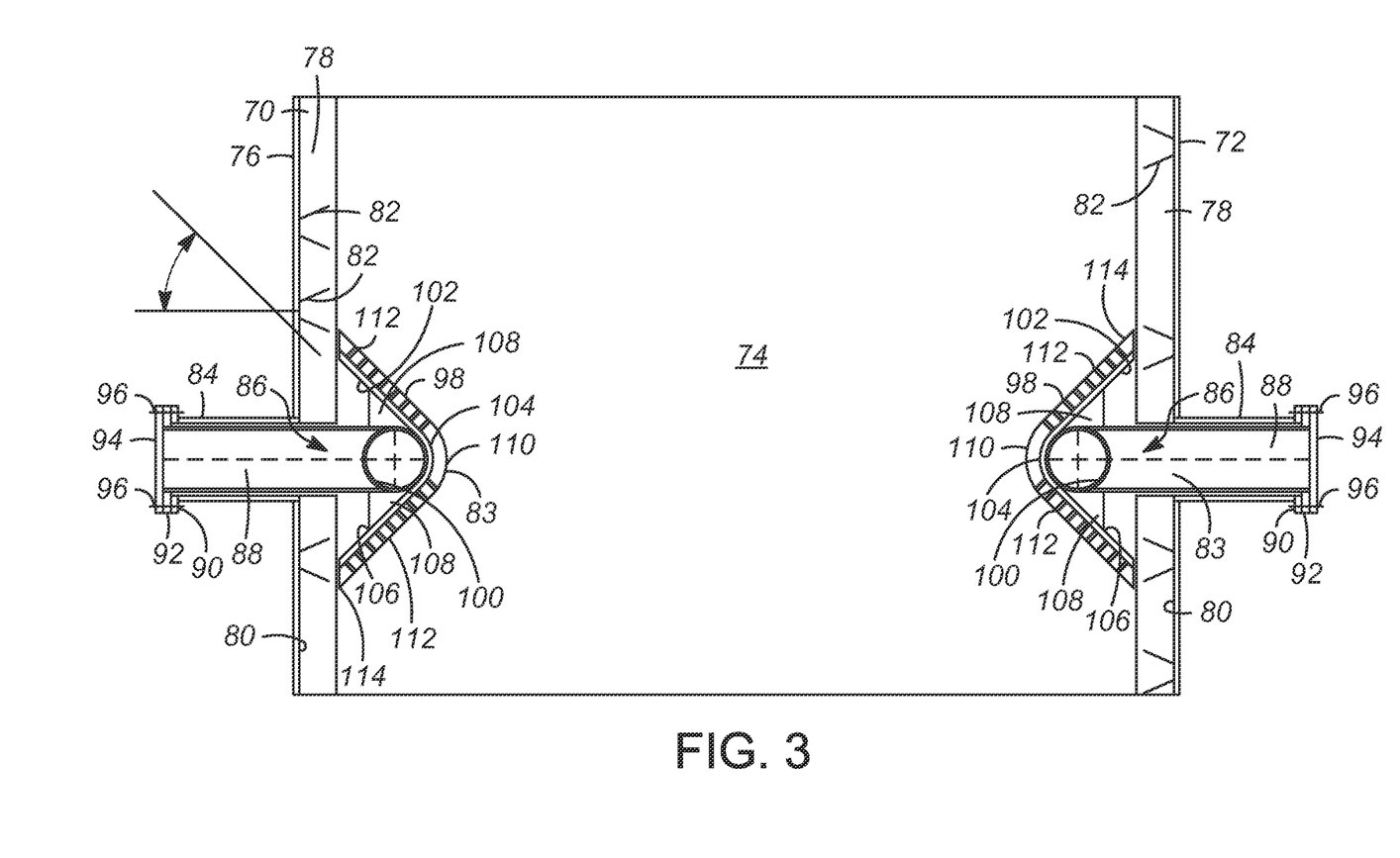
FIG. 3 illustrates, in cross-sectional view, the riser depicted in FIG. 2 along line 3-3.

FIG. 2 illustrates, in cross-sectional view, the riser 12 depicted in FIG. 1 along line 2-2 and FIG. 3 illustrates, in cross-sectional view, the riser 12 depicted in FIG. 2 along line 3-3. Referring to FIGS. 1-3, the riser 12 has a sidewall 70 that defines a cylindrical housing 72 that surrounds an interior 74. In an exemplary embodiment, the cylindrical housing 72 includes a length dimension L that is of from about 10 to about 50 m, such as from about 20 to about 45 m, for example from about 25 to about 38 m. It should be appreciated however that the length dimension L may be adjusted as desired.

Referring to FIGS. 2-3, in an exemplary embodiment, the cylindrical housing 72 comprises a cylindrical shell 76 that surrounds the interior 74 and a refractory lining 78 that is disposed along an inner surface 80 of the cylindrical shell 76 facing the interior 74. In an exemplary embodiment, the cylindrical shell 76 has a thickness of from about 10 to about 25 mm, and the refractory lining 78 has a thickness of from about 100 to about 200 mm. As illustrated, a plurality of anchors 82 (e.g., "V" anchors) extend from the cylindrical shell 76 into the refractory lining 78 and anchor or otherwise fix the refractory lining 78 to the cylindrical shell 76. In an exemplary embodiment, the anchors 82 are configured as a weld clip that is coupled to the cylindrical shell 76 and refractory material is directly cast into the wild clip arrangement onto the inner surface 80 of the cylindrical shell 76. In an exemplary embodiment, the refractory material is an alumina-based concrete that when set or cured, forms a thermal-, abrasion-resistant lining. Alternative materials known to those skilled in the art may also be used to form the refractory lining 78. The cylindrical shell 76 may be made of metal or any other structural material typically used for forming a tubular reactor vessel.

A plurality of baffle assemblies 83 are releasably coupled to the sidewall 70 and extend inwardly in the interior 74 of the riser 12. As illustrated, extending radially outward from the cylindrical housing 72 is a plurality of dead riser nozzles 84 each associated with one of the baffle assemblies 83. In an exemplary embodiment, the dead riser nozzles 84 are configured as conduits each surrounding a channel 86 that extends through the cylindrical housing 72 and is open to the interior 74.

Each of the baffle assemblies 83 comprises an elongated support member 88, e.g., straight tubular or pipe section formed of metal, extending through a corresponding channel 86. In an exemplary embodiment, the dead riser nozzles 84 each have an upstanding nozzle flange 90 that extends from an end of the corresponding dead riser nozzle 84 that is distal from the interior 74. As will be discussed in further detail below, a plurality of filler flanges 92 is correspondingly releasably coupled to the elongated support members 88 and each is disposed adjacent to a corresponding upstanding nozzle flange 90. A plurality of blind flanges 94 is correspondingly disposed adjacent to the filler flanges 92 opposite the upstanding nozzle flanges 90. In an exemplary embodiment, the upstanding nozzle flange 90, the filler flange 92, and the blind flange 94 associated with a particular dead riser nozzle 84 are releasably coupled together to releasably couple the corresponding baffle assembly 83 to the sidewall 70. In an exemplary embodiment, the upstanding nozzle flanges 90, the filler flanges 92, and the blind flanges 94 are correspondingly releasably coupled together by threaded fasteners 96 or other mechanical locking devices, spot welds, and/or sealing welds. As will be discussed in further detail below, the threaded fasteners 96, spot welds, and/or sealing welds can be removed relatively easily to decouple the baffle assemblies 83 from the sidewall 70.

In an exemplary embodiment, the baffle assemblies 83 each have a baffle section 98 that is coupled to a corresponding elongated support member 88 by an arc support member 100, e.g., e.g., curved or arced tubular or pipe section formed for example of metal, and that extends into the interior 74 of the riser 12. In particular and as illustrated, the baffle sections 98 each have a support plate 102, e.g., curved or arced plate formed for example of metal and having for example a generally "arrowhead-shaped" cross-section, disposed in the interior 74 with a side 104 facing the interior 74 and a side 106 facing generally opposite the side 104 towards the sidewall 70. The side 106 is coupled directly to a corresponding arc support member 100 with support or gusset plates 108 extending between the arc support member 100 and the side 106 to stabilize and/or further support the support plate 102.

In an exemplary embodiment, abrasion resistant lining 110 is disposed on the support plates 102 overlying the sides 104. The abrasion resistant lining 110 may be formed using a mesh 112 that is coupled to the corresponding support plate 102 and a refractory material, such as an aluminum-based concrete, may be directly cast into the mesh 112 and set or cured to form a refractory lining that is both thermally resistant and abrasion resistant. Alternative materials known to those skilled in the art may also be used to form the abrasion resistant lining 110.

In an exemplary embodiment, the baffle sections 98 are circumferentially aligned and space apart, e.g., space apart substantially evenly from each other or in some cases not evenly spaced apart may be desired, forming a segmented baffle ring 114 that surrounds and extends inwardly into the interior 74 of the riser 12. In an exemplary embodiment, the baffle sections 98 are spaced apart forming a corresponding gap (indicated by arrows 116) between adjacent baffle sections 98. In an exemplary embodiment and as will be discussed in further detail below, the corresponding gap(s) 116 is from about 75 to about 200 mm to facilitate installing and removing the individual baffle assemblies 83 from the sidewall 70 while one or more adjacent baffles assemblies 83 are releasably coupled to the sidewall extending into the interior 74 of the riser 12.

In an exemplary embodiment, one or more segmented baffle rings 114 may be disposed in the riser 12 at various elevations, such as, for example, correspondingly at elevations X, Y, or therebetween or otherwise (see FIG. 1). As such, the segmented baffle ring(s) 114 can effectively act as a contact flow disruptor device for the upwardly flowing feedstock 14 and catalyst 16 in the riser 12, thereby creating turbulence in the riser 12 to cause more uniform mixing of the feedstock 14 and catalyst 16 to increase reaction efficiency and valuable product yield.

FIGS. 4-7 illustrate, in cross-sectional views, the riser 12 during various baffle installation stages in accordance with an exemplary embodiment. In an exemplary embodiment, the segmented baffle ring 114 (shown in FIGS. 2-3) is installed into the riser 12 by releasably coupling each of the baffle assemblies 83 to the sidewall 70 of the riser 12 in a piecewise orderly manner That is, the baffle assemblies 83 are individually coupled to the sidewall 70 independent of the other baffle assemblies 83 such that when all of the baffle assemblies 83 have been installed in the riser 12, the segmented baffle ring 114 is formed surrounding and extending into the interior 74 as discussed above.

Figure 4:
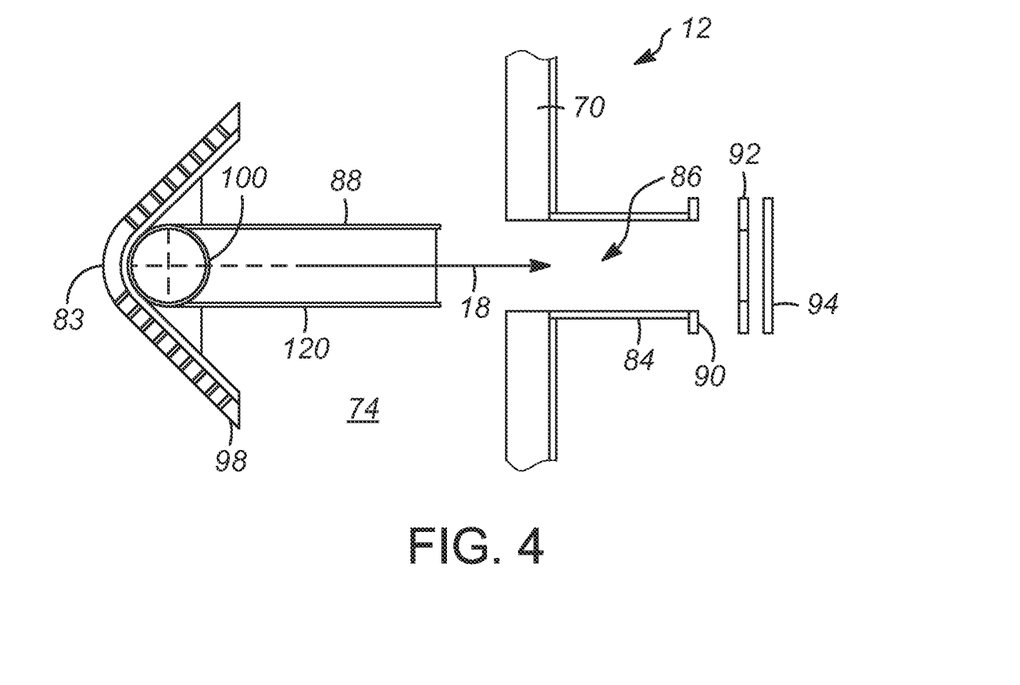
FIGS. 4-7 illustrate, in cross-sectional views, a riser during various baffle installation stages in accordance with an exemplary embodiment.
Figure 5:
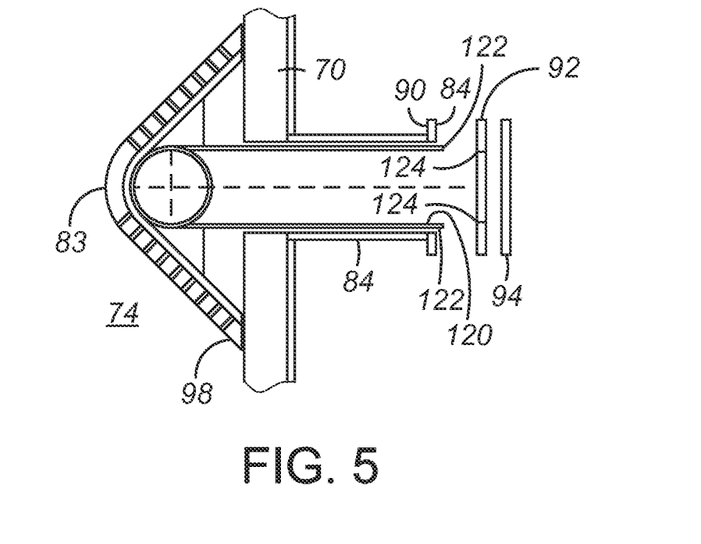

As illustrated in FIGS. 4-5, a particular baffle assembly 83 is positioned adjacent to the sidewall 70 in the interior 74 of the riser 12. The elongated support member 88 is advanced through the channel 86 in a direction (indicated by arrow 118) to position the body 120 of the elongated support member 88 adjacent to the sidewall 70 and extending through the dead riser nozzle 84 with a threaded portion 122 projecting past the upstanding nozzle flange 90 of the dead riser nozzle 84. As illustrated in FIG. 5, the baffle section 98 extends from the sidewall 70 into the interior 74 of the riser 12.

Figure 6:
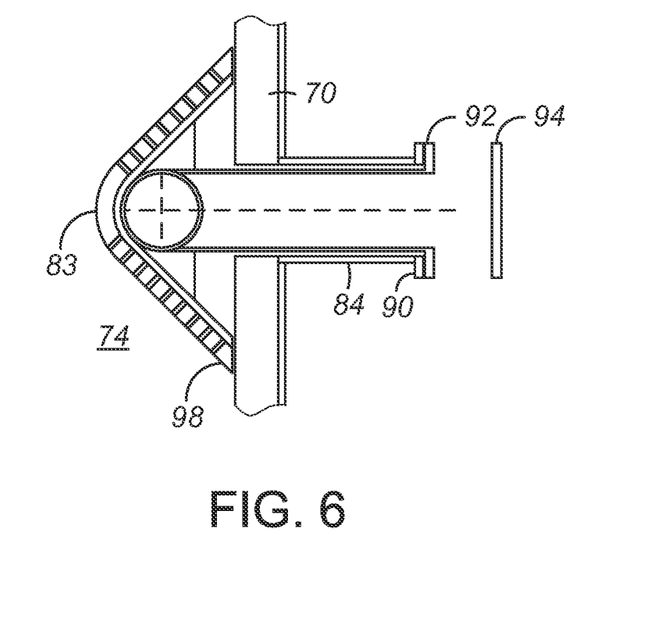
Figure 7:
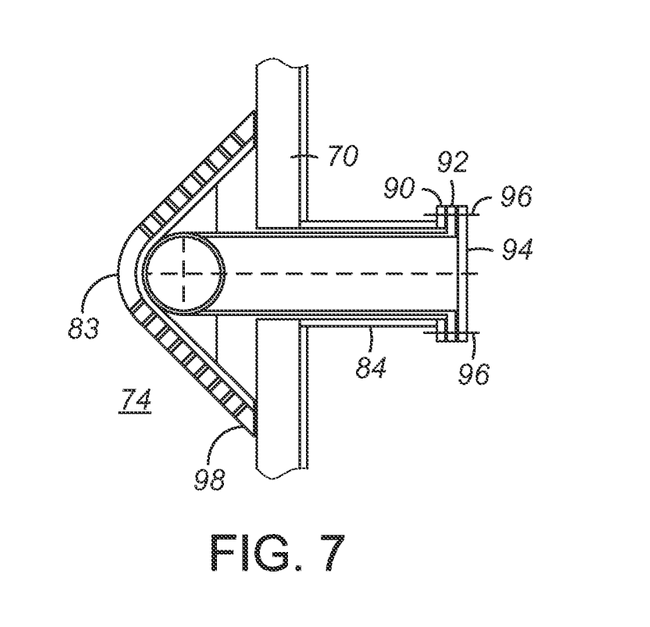

Referring to FIGS. 5-6, the filler flange 92 has a threaded portion 124. The filler flange 92 is positioned adjacent to the upstanding nozzle flange 90 and the threaded portions 122 and 124 are engaged, e.g., via a twisting, turning, or screwing motion for example in a clockwise direction (or otherwise), to releasably couple the baffle assembly 83 to the filler flange 92 and also to the dead riser nozzle 84. As illustrated in FIG. 7, the blind flange 94 is positioned adjacent to the filler flange 92 on a side opposite the upstanding nozzle flange 90. In an exemplary embodiment, the upstanding nozzle flange 90, the filler flange 92, and the blind flange 94 are releasably coupled together by threaded fasteners 96 (or other mechanical locking device), spot welds, and/or sealing welds. The spot welds and/or sealing welds have relatively shallow welding zones and can be easily removed by relatively light grinding or other removal techniques known to those skilled in the art. As such and with reference to FIGS. 4-7, the baffle assembly 83 may be removed from the riser 12 if needed for replacement or maintenance by unfastening the threaded fasteners 96 (or other mechanical locking device) and/or removing the spot welds and/or sealing welds for example by relatively light grinding, removing the blind flange 94, disengaging the filler flange 92 from the baffle assembly 83, e.g., via a twisting, turning, or screwing motion for example in a counterclockwise direction (or otherwise), and advancing the elongated support member 88 out of the channel 86 in a direction opposite the direction 118.

Accordingly, apparatuses and risers for reacting a feedstock in the presence of a catalyst and methods for installing baffles in such risers have been described. The exemplary embodiments taught herein provide a riser comprising a sidewall that defines a cylindrical housing surrounding an interior. A plurality of baffle assemblies is releasably coupled to the sidewall of the riser. The baffle assemblies each comprise a baffle section and together the baffle sections define a segmented baffle ring. The segmented baffle ring extends inwardly in the interior of the riser.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A riser for reacting a feedstock in the presence of a catalyst, the riser comprising:
    a sidewall defining a cylindrical housing that surrounds an interior;
    a plurality of baffle assemblies releasably coupled to the sidewall and each comprising a baffle section, wherein the baffle sections together define a segmented baffle ring extending inwardly in the interior; and
    a plurality of dead riser nozzles extending radially outward from the cylindrical housing and each surrounding a channel that extends through the cylindrical housing towards one of the baffle sections, and wherein each of the baffle assemblies comprises an elongated support member extending through one of the channels, and wherein each of the elongated support members is operatively coupled to one of the baffle sections and is releasably coupled to one of the dead riser nozzles.

2. The riser of claim 1, wherein the cylindrical housing comprises a cylindrical shell and a refractory lining that is disposed adjacent to the cylindrical shell facing the interior, and wherein the segmented baffle ring is disposed adjacent to the refractory lining.

3. The riser of claim 1, wherein the baffle sections are spaced apart to independently define a corresponding gap between adjacent baffle sections.

4. The riser of claim 3, wherein the corresponding gap is independently from about 75 to about 200 mm.

5. The riser of claim 1, wherein the baffle sections are circumferentially aligned and disposed at a predetermined elevation.

6. The riser of claim 1, wherein the baffle sections are each configured having a generally "arrowhead-shaped" cross-section.

7. The riser of claim 1, wherein each of the baffle assemblies comprises an arc support member that is coupled to one of the baffle sections and to one of the elongated support members.

8. The riser of claim 7, wherein each of the baffle sections comprises:
    a support plate having a first side facing the interior and a second side opposite the first side, wherein each of the second sides is coupled to one of the arc support members.

9. The riser of claim 8, wherein each of the baffle sections comprises:
    an abrasion resistant lining that overlies the first side of the support plate.

10. The riser of claim 8, each of the baffle assemblies comprises a gusset plate coupled to and extending between one of the arc support members and the second side of one of the support plates.

11. The riser of claim 1, wherein each of the dead riser nozzles has an upstanding nozzle flange that extends from an end of the corresponding dead riser nozzle that is distal from the interior, and wherein the riser further comprises:
    a plurality of filler flanges correspondingly releasably coupled to the elongated support members, wherein each of the filler flanges is disposed adjacent to one of the upstanding nozzle flanges.

12. The riser of claim 11, wherein each of the filler flanges has a first threaded portion and each of the elongated support members has a second threaded portion that releasably engages the first threaded portion.

13. The riser of claim 11, further comprising:
    a plurality of blind flanges correspondingly disposed adjacent to the filler flanges opposite the upstanding nozzle flanges.

14. The riser of claim 13, wherein one of the upstanding nozzle flanges, one of the filler flanges, and one of the blind flanges are correspondingly releasably coupled together by a threaded fastener or other mechanical locking device, a spot weld, a sealing weld, or a combination thereof.

15. An apparatus for fluid catalytic cracking of a feedstock, the apparatus comprising:
    a riser configured for contacting the feedstock with a catalyst to form a cracked product stream and a spent catalyst, the riser comprising:
        a sidewall defining a cylindrical housing that surrounds an interior; and
        a plurality of baffle assemblies releasably coupled to the sidewall and each comprising a baffle section, wherein the baffle sections together define a segmented baffle ring extending inwardly in the interior, comprising an elongated support member advanced through a channel that is surrounded by a dead riser nozzle that extends radially outward from the cylindrical housing, wherein the channel extends through the cylindrical housing and the elongated support member is coupled to one of the baffle sections, and wherein the elongated support member is advanced through the channel in a direction away from the interior to position the one of the baffle sections adjacent to the sidewall facing the interior; and releasably coupling the elongated support member to the dead riser nozzle;
    a reactor vessel in fluid communication with the riser and configured to separate the spent catalyst from the cracked product stream;
    a stripper in fluid communication with the reactor vessel and configured to remove adsorbed and/or entrained hydrocarbons from the spent catalyst; and a regenerator in fluid communication with the stripper and configured to regenerate the spent catalyst to form regenerated catalyst for use in the apparatus.

16. A method for installing a baffle in a riser for reacting a feedstock in the presence of a catalyst, the method comprising the steps of:
   providing a sidewall that defines a cylindrical housing surrounding an interior; and
   releasably coupling a plurality of baffle sections to the sidewall to define a segmented baffle ring that extends inwardly in the interior, comprising advancing an elongated support member through a channel that is surrounded by a dead riser nozzle that extends radially outward from the cylindrical housing, wherein the channel extends through the cylindrical housing and the elongated support member is coupled to one of the baffle sections, and wherein the elongated support member is advanced through the channel in a direction away from the interior to position the one of the baffle sections adjacent to the sidewall facing the interior; and releasably coupling the elongated support member to the dead riser nozzle.

17. The method of claim 16, wherein the dead riser nozzle has an upstanding nozzle flange that extends from an end that is distal from the interior, and wherein releasably coupling the elongated support member comprises:
   positioning a filler flange adjacent to the upstanding nozzle flange; and
   releasably engaging a first threaded portion of the filler flange with a second threaded portion of the elongated support member.

18. The method of claim 17, wherein the step of releasably coupling the elongated support member to the dead riser nozzle comprises:
   positioning a blind flange adjacent to the filler flange by a side opposite the upstanding nozzle flange; and
   releasably coupling the upstanding nozzle flange, the filler flange, and the blind flange together.

* * * * *